Feb. 3, 1959  M. PLEASURE  2,872,673
RADAR SIGNAL SIMULATOR
Filed Dec. 27, 1955  4 Sheets-Sheet 4
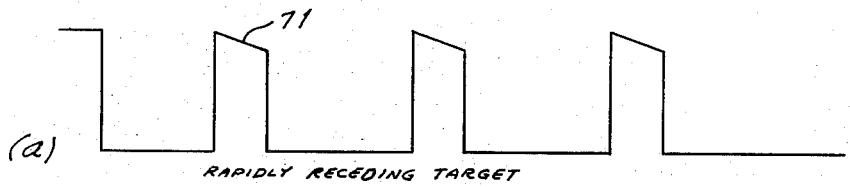
(a) RAPIDLY RECEDING TARGET
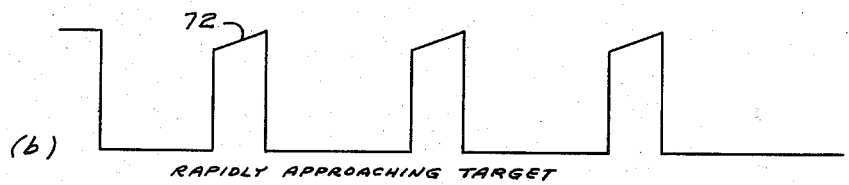
(b) RAPIDLY APPROACHING TARGET
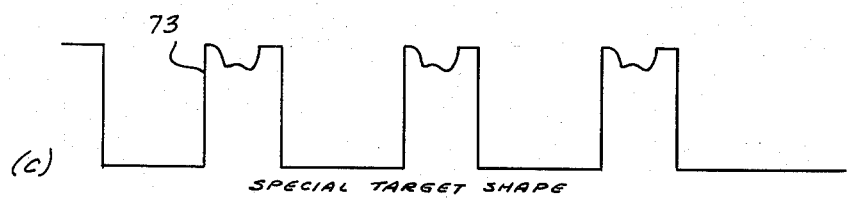
(c) SPECIAL TARGET SHAPE
FIG. 6  SPECIAL TARGET SHAPES
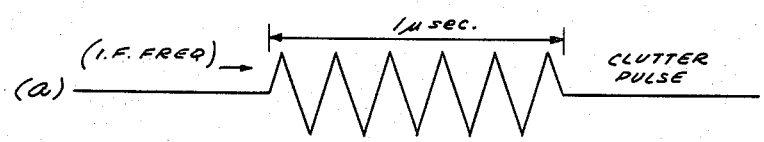
(a) (I.F. FREQ) — CLUTTER PULSE
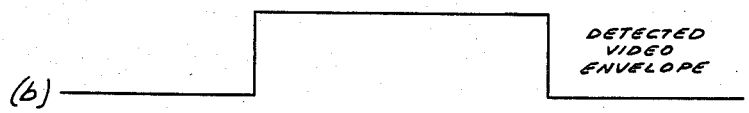
(b) DETECTED VIDEO ENVELOPE
FIG. 7.
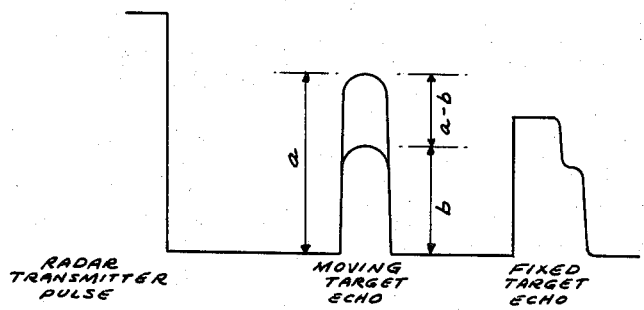
RADAR TRANSMITTER PULSE   MOVING TARGET ECHO   FIXED TARGET ECHO
FIG. 8.  A-SCOPE OF NORMAL RADAR
INVENTOR.
Myron Pleasure
By Michael S. Striker
Att.

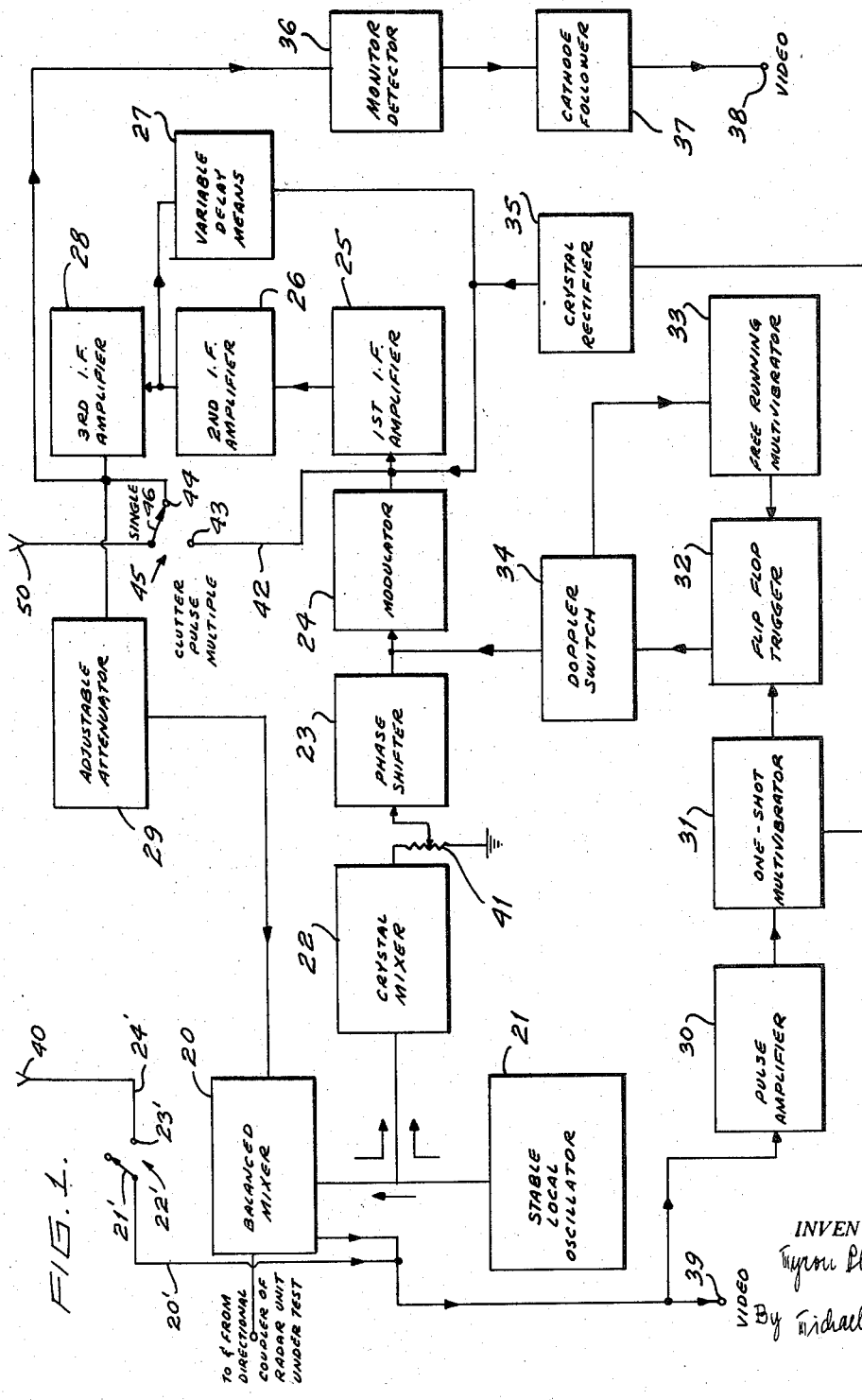

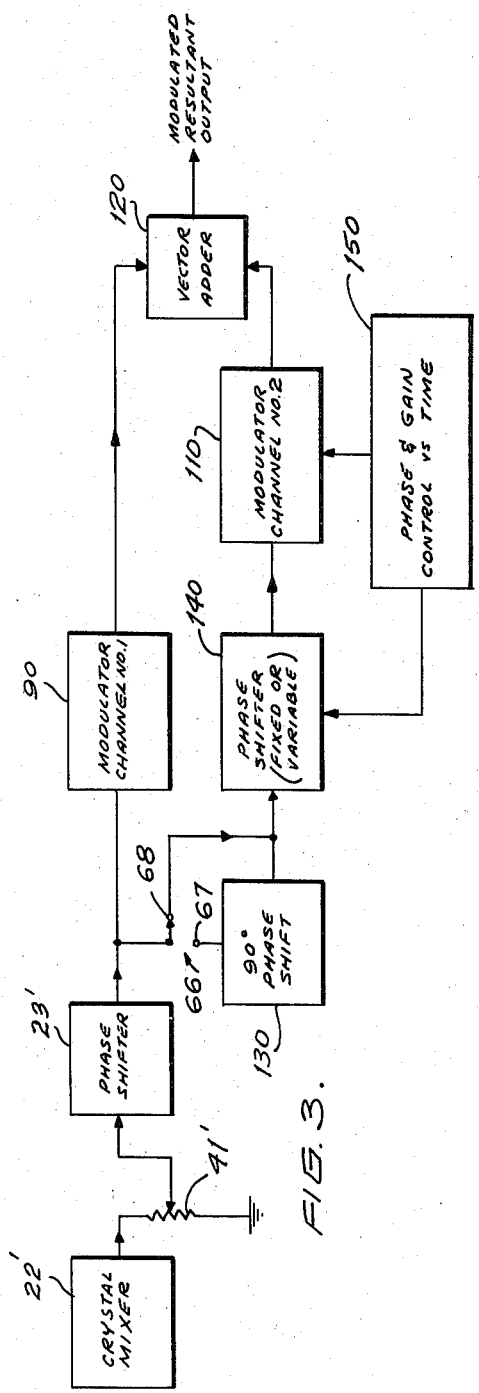
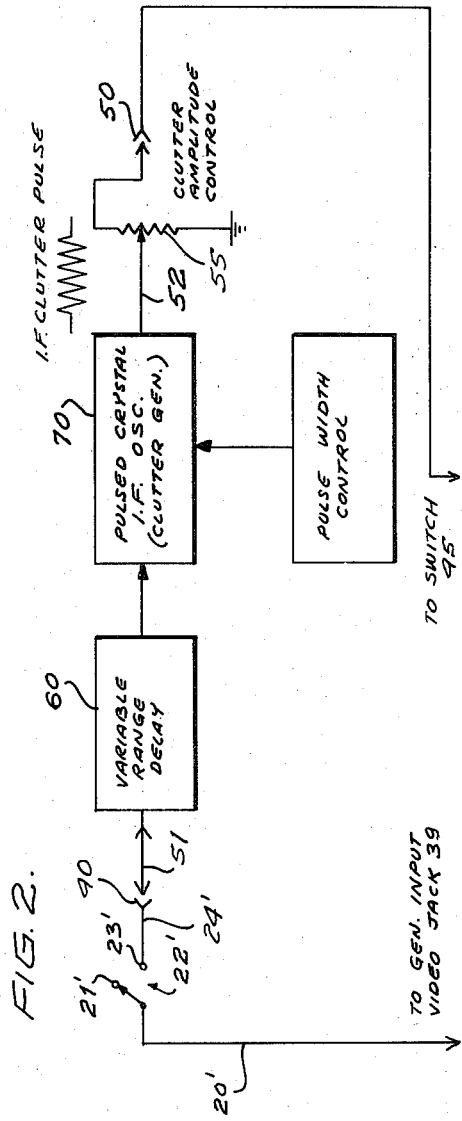

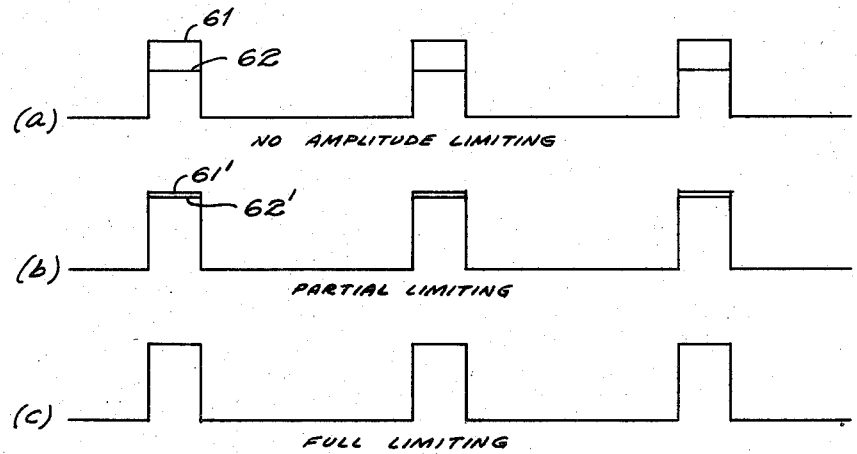
FIG. 4. NON-COHERENT TARGETS ON RADAR A-SCOPE
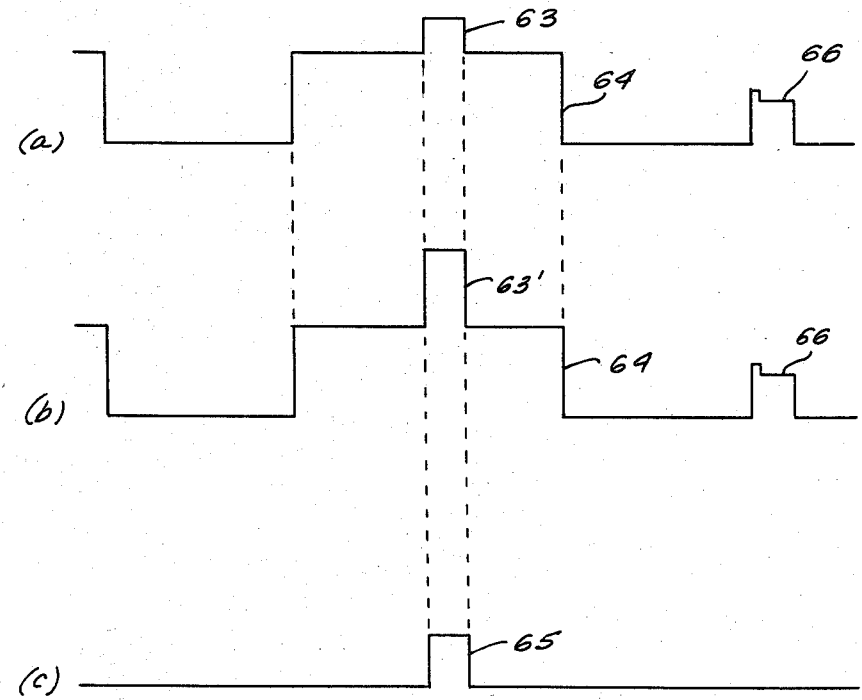
FIG. 5.

United States Patent Office 2,872,673
Patented Feb. 3, 1959

2,872,673
RADAR SIGNAL SIMULATOR
Myron Pleasure, New York, N. Y., assignor to Pitometer Log Corporation, New York, N. Y.
Application December 27, 1955, Serial No. 555,602
6 Claims. (Cl. 343—17.7)

The present invention relates to a new and improved radar signal simulator. More particularly, the present invention relates to a new and improved radar signal simulator wherein simulated radar targets are produced for testing either coherent or non-coherent MTI radar systems.

The radar systems which have moving target indicators are called MTI radar systems since they have equipment for eliminating the fixed targets in the area and for presenting only the moving targets. These types of radar systems can advantageously be used in large terminal airports for example which are surrounded by densely populated areas. In such an arrangement there are usually large buildings and other objects in the vicinity of the airport so that it is difficult to set up a radar system in an ideal location. Accordingly, the MTI radar system eliminates the fixed surface objects (called "ground clutter") by cancelling those received radar impulses which correspond to fixed surface objects. Therefore, the impulses corresponding to the airplanes or moving targets are more clearly seen and worked with. Also, an idea of the speed and direction of a moving target can be obtained by an MTI radar system more readily than with the ordinary radar system.

The present invention deals with a radar signal simulator for generating carrier frequency impulses corresponding to simulated radar targets. With the present invention the radar targets can correspond to the fixed surface objects, to movable or moving targets or to a desirable combination thereof. Either "coherent" phase-sensitive MTI radar systems, "non-coherent" amplitude-sensitive radar systems, as well as "normal" radar systems can be tested by apparatus incorporating the principles of the present invention.

In a copending U. S. patent application Serial No. 419,660—Clarence H. McShan, a radar signal simulator for MTI coherent radar systems is described. A coherent MTI radar system is the type wherein fixed and moving targets are distinguished from one another by detecting the phase shifts between successive echoes from the moving target. Since there is no phase shift in successive echoes for the fixed target, it is possible to eliminate echoes corresponding to the fixed target by comparing successive echoes and cancelling those echoes which are not shifted in phase from each other.

As indicated in the above cited patent application, in order to provide simulated targets for coherent MTI radar systems, it is necessary to provide impulses whose phase is very accurately controlled. In the coherent MTI radar system there is a limiter which limits the amplitude of the received impulses in order to insure a predetermined amplitude for each of the received echoes, thereby providing a system wherein only the phase between adjacent impulses can vary, but not the amplitude.

In a non-coherent MTI radar system different detecting principles are used. In the non-coherent radar system, the system stores the target information which is received as echoes from the first transmitted impulse and compares the information so stored with the echoes received from the second or some other later transmitted impulse. In the non-coherent MTI radar system, the amplitude of the target echoes received at the radar system are not limited in the manner of the coherent system. Rather, the amplitude variation between received impulses corresponding to target echoes are utilized to detect the difference between moving targets and fixed targets. In this way, also, it is possible to detect moving targets which may be moving at certain speeds which correspond to a "blind spot" in the coherent MTI radar system. Non-coherent type MTI radar systems also have certain advantages for use from a moving base, as on a battleship, or from an airplane.

Accordingly, the radar signal simulator in the above cited U. S. patent application, cannot be used for testing non-coherent MTI radar systems since it was not designed to provide impulses whose amplitude varied from impulse to impulse and the output targets provided by the described apparatus are limited in its final stages to provide constant amplitude targets having varying phase.

Accordingly, it is an object of the present invention to provide a new and improved radar signal simulator which overcomes the disadvantages of conventional radar signal simulators.

A second object of the present invention is to provide a new and improved radar signal simulator capable of testing non-coherent radar systems.

A further object of the present invention is to provide a new and improved radar signal simulator using amplitude modulation for varying the amplitude of generated impulses in order to simulate the target echoes for non-coherent MTI radar systems.

Another object of the present invention is to provide a radar signal simulator which can generate impulses corresponding to fixed and moving targets and combinations thereof.

Still a further object of the present invention is to provide a new and improved radar signal simulator which can provide impulses in any desired shape and phase position for testing many different types of radar systems.

With the above objects in view, the present invention relates to a radar signal simulator wherein voltage impulses are generated for simulating radar targets, including receiver means adapted to be coupled to a radar unit for receiving carrier frequency radar impulses, and generating means coupled to the receiver means for producing at least one retarded carrier frequency impulse in synchronism with each of the received radar impulses or groups thereof, respectively, the generating means including therein means for shifting the phases and amplitudes of the retarded carrier frequency impulses by predetermined amounts.

In another embodiment of the present invention a first and second retarded carrier frequency impulse is generated in synchronism with each of the received radar impulses respectively. The first retarded carrier frequency impulse corresponds to a fixed radar target and the second retarded carrier frequency impulse corresponds to the moving radar target.

In still another embodiment of the present invention means are provided for generating a first retarded carrier frequency impulse and a plurality of second retarded carrier frequency impulses in synchronism with each of the received radar impulses respectively. As above, the first retarded carrier frequency impulse corresponds to a fixed radar target while the plurality of second retarded carrier frequency impulses corresponds to radar moving targets.

Another feature described makes it possible to have a plurality of first retarded carrier frequency impulses corresponding to many fixed radar targets, as well as a plurality of second type retarded carrier frequency impulses corresponding to one or more moving radar targets, and also combinations as desired, of both types of targets.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a block diagram showing the operational relationship between the various electronic components of one embodiment of the present invention;

Fig. 2 is an electric block diagram of apparatus used for generating impulses corresponding to fixed targets and used with the apparatus shown in Fig. 1;

Fig. 3 is a block diagram of a different type of modulator which can be used in conjunction with the apparatus shown in Fig. 1;

Fig. 4 shows the wave forms of impulses exhibited on the A-oscilloscope of the radar system;

Fig. 5 shows the wave forms generated by the apparatus of Figs. 1 and 2 and the resultant wave shapes after cancellation in the radar system;

Fig. 6 shows the wave forms of impulses than can be generated with the apparatus of Figs. 1 and 3;

Fig. 7 shows the wave forms of impulses generated by the apparatus of Fig. 2; and Fig. 8 shows the A-scope of a normal radar system showing amplitude variation of a moving target from pulse to pulse.

Referring to the drawings and more particularly to Figs. 1 and 2, there is shown a block diagram of the radar signal simulator including a balanced mixer 20 which is directly coupled to the directional coupler of a radar unit under test. (It is to be understood that the invention is equally applicable to the case where the balanced mixer is not directly coupled to the radar unit but is instead provided with antenna means or a pick-up loop of some other type for receiving the transmitted radar impulse.)

Balanced mixer 20 attenuates the received radio-frequency impulses to a usable level. The conductor 20' is connected to the video jack 39 of the balanced mixer for receiving the radio-frequency impulses for purposes to be explained with respect to Fig. 2. In Fig. 1 it can be seen that the jack 39 is connected to the movable arm 21' of a switch 22'. A fixed contact 23' of the switch 22' is connected by a conductor 24' to a jack 40. The connection to the jack 40 will be explained hereinbelow with respect to Fig. 2.

The output of the balanced mixer 20 and the output of the stable local-oscillator 21 are heterodyned in crystal mixer 22 to produce intermediate-frequency output pulses. The balanced mixer 20 also detects and attenuates the incoming radar impulses and supplies the detected impulses to pulse amplifier 30 and video jack 39. The wave shape of the detected radar impulses may readily be viewed by connecting a test oscilloscope to the jack 39. The relative power level of these pulses may also be measured as explained in the copending McShan application.

Connected to the output of the crystal mixer 22 is a potentiometer 41 which has one of its sides connected to ground so that the output of the crystal mixer 22 can be varied downwards to such a level as does not cause the later simulator stages to limit in amplitude, if this limiting should not be desired (as for use with non-coherent radars).

The level of the impulses emitted from the crystal mixer 22 may be varied by varying the setting of the potentiometer 41. These impulses, which are intermediate-frequency impulses, are fed through phase-shifter 23 to a modulator 24 which can shift the phase or vary the amplitude, or both, of the intermediate-frequency radar impulses. This can add a moving target component to the simulated echo impulses. The output of the modulator 24 is applied to intermediate-frequency amplifiers 25, 26 and the output of the second intermediate-frequency amplifier 26 is fed to a fixed or variable delay means 27. From the delay means 27 the impulses are fed back to the input of the first intermediate-frequency amplifier 25.

In view of the above, the intermediate-frequency radar impulses circulate through the loop comprising blocks 25, 26 and 28 accumulating on each cycle a desired time delay depending on the setting of the fixed or variable delay means 27. For example, a time delay of 61.8 microseconds introduced by the delay means 27 would provide simulated echo pulses which are spaced apart the equivalent of 5 nautical miles.

Also connected to the output of the modulator 24 is a conductor 42 which is connected to a fixed contact 43 of a switch 45. The contact 43 is marked clutter pulse multiple. A second fixed contact 44 of the switch 45 is marked single. The movable arm 46 of the switch 45 is connected to a jack 50 to receive its triggering impulses in a manner to be explained hereinbelow with respect to Fig. 2.

After a predetermined number of circulations through the loop 25, 26, 27 as hereinabove described, a gating impulse from the one-shot multivibrator 31 is fed to the control electrode of the first intermediate-frequency amplifier 25 through the crystal rectifier 35 which terminates the circulation of the impulses through this loop. In this manner it is possible to produce a controllable number of intermediate-frequency impulses in response to each received radar impulse. These correspond to the simulated targets later returned at carrier frequency to the radar under test.

The output of the third intermediate-frequency amplifier 28 is applied through an adjustable attenuator 29 to the balanced mixer 20 where the trains of intermediate-frequency impulses are mixed with the output of the stable local-oscillator 21 and converted to trains of simulated radio-frequency target impulses. These radio-frequency target impulses are applied directly to the directional coupler of the radar system under test by means of the same conductor as the received radar input impulses. Of course, if an antenna is used, instead of being coupled directly to the radar unit, the simulated target impulses will be radiated toward the radar unit and the latter will receive these pulses by means of its own antenna.

The output of the third intermediate-frequency amplifier 28 is also supplied to a monitor detector 36 which is coupled to the cathode follower 37. At the terminal 38, there appears a detected video output of the simulated intermediate-frequency target impulses and these impulses may be viewed by connecting a test oscilloscope to the terminal 38.

Elements 30—33 comprise the signal simulator timing circuits. These perform a number of functions including a gating of intermediate-frequency amplifier 25 to provide any desired plurality of simulated intermediate echo pulses in synchronism with each received radar radio-frequency impulse; biasing of the modulator 24 to produce phase, amplitude or any combination of phase and amplitude shifts to produce the simulated moving target; and pulsing action in order to facilitate the measurement of fixed-moving or alternating fixed and moving targets.

In brief, the timing circuits operate as follows: The balanced mixer 20 supplies detected radar impulses to pulse amplifier 30 which in turn triggers one-shot multivibrator 31. In its quiescent condition, one-half of multivibrator 31 conducts and the other half is cut off. During its quiescent state, a steady bias is applied to the crystal rectifier 35 so that it conducts and effectively shunts the control grid to ground and thereby prevents the amplifier from amplifying any further signals applied by the delay means 27. Upon the application of a pulse to multivibrator 31, the latter generates a negative-going gate which is applied to rectifier 35 causing said rectifier to be cut off and thereby to provide a high impedance between the control grid of amplifier 25 and ground. During the negative gating interval, signals supplied to the control grid by delay means 27 are amplified. In a preferred embodiment of the invention the negative gating interval can be made sufficiently long to permit ten or more simulated echo pulses to be produced in synchronism with each received radar impulse.

Flip-flop trigger 32 is triggered by one-shot multi- of stable equilibrium. In a preferred embodiment of the invention this trigger circuit comprises a multivibrator one-half of which conducts during one of the conditions of stable equilibrium and the other half of which conducts during the other of the conditions of stable equilibrium. The circuit remains in either of the two conditions, with no change of plate, grid or cathode potential, until some action occurs which causes the non-conductive section to conduct. The two sections then reverse their function and remain in the new condition until plate current flows in the cut off section.

Flip-flop trigger 32 is triggered by one-shoe multivibrator 31. Upon being triggered, circuit 32 generates a negative-going square wave pulse in its output circuit which is applied to the control grid of the modulator 24 when the doppler switch 34 is in certain positions.

The flip-flop trigger 32 is actuated upon each occurrence of a positive-going leading edge of the output of the one-shot multivibrator 31. The frequency output of the flip-flop trigger circuit is one-half that of the one-shot multivibrator.

Free running multivibrator 33 is placed in the circuit in one position of the doppler switch 34. In this position, the cathode load impedance of the free running multivibrator 33 is reduced and the multivibrator oscillates at a predetermined rate gating the flip-flop trigger 32 at this rate. For example, the free running multivibrator 33 may have a symmetrical output wave at a frequency of about 5 cycles per second. This allows the simulator to alternate its output between fixed and moving targets at this same 5 cycle rate.

Referring now to Fig. 2, it can be seen that connected to the jack 40, which corresponds to the jack 40 in Fig. 1, is a conductor 51 which is connected at its other end to the input of a variable range delay circuit 60. The output of the variable range delay is connected to an oscillator 70 which is a pulsed crystal I. F. oscillator which is used for generating impulses that correspond to fixed targets. As can be seen from Fig. 2, the oscillator 70 is connected to a control 80 for controlling the pulse width of the oscillator output. The output of the oscillator is applied on the conductor 52 to the movable tap of a potentiometer 55 for controlling the clutter pulse amplitude. The potentiometer 55 is connected between ground and the output jack 50 of Fig. 1. The wave shape of the cutter pulse output of the oscillator 70 is shown in Figs. 7(a) as an I. F. pulse and (b) as its detected video envelope.

Referring now to Figs. 1 and 2, it can be seen that when the switch 22' is in its off position, namely when the movable arm 21' of the switch 22' is out of contact with the contact 23', the oscillator 70 of Fig. 2 is not connected into the circuit to receive its trigger pulse. Accordingly, in this position of the switch 22', which is illustrated, the apparatus will operate substantially as described in the above cited McShan application. However, because of the use of the potentiometer 41 connected after the crystal mixer 22, it is possible to vary the operation of the radar signal simulator so that it will provide impulses which simulate moving targets for use with non-coherent radar systems. This can be done as described below.

The radar signal simulator is coupled to the radar unit under test or is adapted to receive the impulses transmitted from the transmitter of the radar unit. These carrier frequencies or radio-frequency impulses received from the radar unit under test are applied to the balanced mixer and are mixed with the stable local oscillator 21 to provide intermediate-frequency impulses These intermediate-frequency impulses are fed through the crystal mixer 22 and the amplitude of these impulses may be adjusted by the potentiometer 41. For this purpose, the operator views the radar's A-oscilloscope to observe the wave shape of the impulses detected by the radar from the simulator.

Referring now to Fig. 4 the wave form of the impulses received at the radar unit from the simulator and displayed on the A-scope is shown. Fig. 4(a) shows the wave form of the simulated target when the modulator 24 and the simulator apparatus is in a non-limiting condition. In this condition the difference in amplitude between successive impulses will be displayed by the A-scope of the radar unit. Accordingly, in Fig 4(a), three impulses are shown, each impulse being made up of two different impulses of different amplitude. That is, the amplitude at line 61, for example, can represent the first impulse received by the radar unit. The amplitude corresponding to the line 62 can represent the amplitude of the next impulse received by the radar unit. In other words, line 61 can represent pulses 1, 3, 5, 7, etc., and line 62 can represent pulses 2, 4, 6, 8, etc. From this wave shape on the A-scope, the radar operator who is testing the radar set can tell that the radar signal simulator in accordance with the principles of the present invention is non-limiting in condition. Accordingly the system, with the impulses of different amplitudes, can be used for testing non-coherent radar systems wherein impulses of different amplitudes are used. The operator can then check the operation of the radar system to determine whether the radar system is operating satisfactorily, using the radar's PPI-scope, or its A-scope as may be more convenient.

For use with coherent types of radar systems, the radar operator varies the position of the potentiometer 41 and watches the A-scope. As the potentiometer 41 is turned in a particular direction, the amplitude of the line 62 in Fig. 4(a) will start to increase and approach line 61. This position is shown in Fig. 4(b) wherein the line 62' is substantially closer to the line 61' than the line 62 was to 61. Finally, the amplitude of the line 62 increases until it is equal to the amplitude of the line 61 and the radar signal simulator will then be emitting pulses which are all exactly equal in amplitude but are only different in phase. Since the coherent MTI radar systems operate with impulses which are exactly equal in amplitude but differ only in phase, it is clear that in this position of the potentiometer 41, the signal simulator provides impulses which can be used for testing coherent MTI radar systems.

Similarly, by changing the position of the potentiometer 41 so that the signal simulator is no longer in limiting condition, the apparatus can be used for providing impulses for testing non-coherent MTI radar systems. This action of potentiometer 41 can also be accomplished automatically so that by throwing a simple switch, the operator could choose to simulate either targets of constant limited amplitude and variable phase, or else targets of fixed phase and varying amplitude. In the former case a limiting type I. F. amplifier could be used as amplifiers 25, 26 and 28 of Fig. 1. In the latter case an A. V. C.-type non-limiting I. F. could be used instead.

With the apparatus incorporating the principles of the present invention it is possible to combine several different types of "cluter" signals. For example, one type of signal could correspond to a fixed target and the next type of signal could correspond to a moving target. This is done by the apparatus shown in Figs. 1 and 2 in combination. For this purpose the switch 22' of Fig. 1 is placed so that the movable arm 21' thereof is connected to the fixed contact 23'. In Fig. 2 it can be seen that this applies the detected radar impulses coming from the balanced mixer at video frequency to the variable range delay apparatus 60. This range delay apparatus can be varied and adjusted to a desired position so that the impulse from the radar system is applied to the input of the pulsed crystal I. F. oscillator 70 after a predetermined time delay. This impulse applied to the oscillator 70 causes the latter to emit an I. F. clutter impulse having the wave shape shown in Figs. 7(a) at I. F. and 7(b) when detected. The pulse width control 80 of Fig. 2 varies the emitted pulse length of the oscillator 70. Pulse amplitude control 55 varies the emited pulse amplitude of the oscillator 70.

Referring again to Fig. 1 it can be seen that this clutter impulse from the oscillator 70 is applied to the jack 50 and may be applied by means of the switch 45 either to the conductor 42 which applies these impulses just after the modulator 24 or, these impulses can be applied to the fixed contact 44 just after the third I. F. amplifier 28.

If the switch 45 is in the position wherein the movable arm 46 is connected to the contact 43, the I. F. clutter impulses are applied on conductor 42 to the output of the modulator 24. Accordingly, these impulses are superimposed on the intermediate-frequency impulses provided at the output of the modulator. If the pulse width of the clutter impulse generated by the oscillator 70 is substantially larger than the impulse produced at the output of the modulator 24, wave shapes of the type shown in Fig. 5 result. In Fig. 4(a), the small pulse 63 superimposed on the larger pulse 64 represents the impulses supplied at the output of the modulator 24. The larger impulse 64 represents the envelope of the I. F. clutter impulse as shown in Fig. 7(b). It can be seen that the impulse 63 is superimposed on the impulse 64.

It should be clear that the variable range delay 60 may be adjusted so that the I. F. clutter impulse 64 occurs at a different time interval than the impulse 63. In this case these impulses would appear substantially adjacent one another rather than being superimposed one on top of the other. However, the wave shape shown in Fig. 5(a) wherein the two are superimposed one on top of the other can be compared to a situation where a moving target is moving along a large fixed object. For example, a truck or a tank moving along a road on a hill would represent the wave form shown in F 5 (a). The impulse 63 would represent the moving truck or tank and the impulse 64 would represent the large fixed object such as the hill.

These superimposed impulses would be circulated through the delay loop with only the moving targets passing through the phase shifter 23 and the modulator 24. In this manner a plurality of impulses each having the shape shown in Fig. 5(a) would be emitted for each impulse received from the radar system at the input of the balanced mixer. Accordingly, when the apparatus is in non-limiting condition, successive impulses applied through the modulator will have different amplitudes. However, the amplitude of the I. F. clutter impulse applied through the switch 45 will remain substantially the same from pulse to pulse since it does not pass through the modulator.

It can be seen that in Fig. 5(a) the pulse 63 is relatively small compared to the amplitude of pulse 64. Actually, the amplitude of the clutter pulse can be controlled at will by the clutter amplitude control potentiometer 55 shown in Fig. 2. Accordingly, the clutter amplitude has a definite known amplitude relationship with the moving target amplitude and the clutter may be set smaller than the moving target if desired. In Fig. 5(b), which represents the next impulse produced by the impulses from the radar unit, the impulse 63' has an amplitude which is substantially larger than the impulse 63. This shows the pulse-to-pulse amplitude variation characteristic of non-coherent simulated moving targets.

The amount of pulse-to-pulse amplitude variation occurring in a moving target determines its visibility to a non-coherent type MTI radar. In the theory of coherent type MTI radars, a sub-clutter visibility figure in decibels abbreviated as SCV–DB is defined as a function of the pulse-to-pulse phase shift between targets. This definition for coherent type radars is given in the above cited McShan patent application as well as in the published literature so that it need not be repeated here.

An analogous definition of sub-clutter visibility for non-coherent radar systems can be useful and will be made here. Referring to Fig. 8, if $a$ represents the height of a moving target reflection from one radar impulse, and $b$ represents its amplitude at the next radar impulse, both being shown as superimposed on the normal radar A-scope in Fig. 8, then it can be said:

(1) $\dfrac{a+b}{2}$ = average target amplitude and (2) $(a-b)$ = pulse-to-pulse target amplitude change Evidently, we can say that this target, which gives amplitude $a$ on one pulse and amplitude $b$ on the next, is equivalent to a "pure" fixed target of amplitude $(a+b)/2$ added to a "pure" moving target of an alternating amplitude which can be written:

(3)

$\dfrac{\pm(a-b)}{2}$ = moving target component amplitude

The "plus or minus" sign is required to indicate that this "moving target component" of the total target, which is composite, as are most real moving targets, is alternating in sign from pulse-to-pulse. If the sub-clutter visibility of the total target is defined geometrically as the ratio of the moving target component to the fixed target component, we get:

(4) $$SCV = \dfrac{\dfrac{a-b}{2}}{\dfrac{a+b}{2}}$$

or (5) $$SCV = \dfrac{a-b}{a+b}$$

In decibels, then, (6) $$SCV-DB = 20 \log_{10}\left(\dfrac{a-b}{a+b}\right)$$

This definition of sub-clutter visibility preserves a very close analogy with the vector-geometrical definition for the phase change for a definite sub-clutter visibility in coherent types of MTI radar systems given by the standard text "Radar System Engineering"—Louis Ridenour, Editor (M. I. T. Radation Laboratory Series, volume 1). It is to be noted, however, that any desirable definition of sub-clutter visibility can be used and followed in the radar signal simulator incorporating the principles of the present invention.

The modulator 24 shown in Fig. 1 could have a control calibrated directly in SCV–DB for amplitude modulated non-coherent moving targets. This control might be connected to the modulator 90 of Fig. 3, whose operation will be explained hereinbelow, and time controlled by circuits as shown in blocks 30—34 of Fig. 1. In addition, a separate control could be used for the phase and gain control 150 of Fig. 3 and modulator 110 thereof for coherent type SCV–DB measurements on coherent MTI radars, as described in the above cited McShan patent application.

Another preferred embodiment of the present invention might be to use a single knob and potentiometer as an SCV–DB control, with concentric scales, one indicating coherent SCV–DB, and one indicating non-coherent SCV–DB. For this purpose, the modulator 24 of Fig. 1 can be constructed as a cathode follower and the potentiometer 41 can be set for the non-limiting condition. With this arrangement the modulator 24 will provide some incidental amplitude modulation which can be utilized to give amplitude-modulated non-coherent moving targets. The SCV–DB calibration correction curve for this amplitude modulaton operaton of the cathode-follower phase shifter or modulator 24 can be provided so that the concentric scales, above-mentioned, could be correctly calibrated for the particular radar system used. Such a moving target radar signal simulator would have the advantage of being compact and of having few components and panel controls required.

The signal simulator incorporating the principles of the present invention operates in such a fashion that the first train of impulses corresponding to Fig. 5(a) is applied to the input of the radar system and in the next train of impulses, having the shape shown in Fig. 5(b) is applied to the radar system. In the non-coherent MTI radar system these successive received pulses are subtracted one from the other so that the only impulses that are displayed on the PPI-scope are the difference impulses between the two successive received impulses. Since the fixed clutter impulse 64 introduced at intermediate-frequency, always has the same amplitude and width for particular tests, the subtraction of Fig. 5(b) from Fig. 5(a) will cancel the effect of the impulses 64. The same is true for the fixed target 66. However, since the impulses 63 and 63' have different amplitudes, a resultant impulse will be provided in the radar system which corresponds to the difference between the two impulses.

The above is shown in Fig. 5(c) where impulse 65 has an amplitude corresponding to the difference between the amplitudes of impulse 63' and 63. Impulse 65 is known as the moving target residue, since it results from a subtraction performed by the MTI radar cancellation circuit. Although Fig. 5 illustrates only the residue obtained by a non-coherent MTI radar due to an amplitude change in a moving target, it is understood that similar figures could be made to show residue due to changes in moving targets pulse length, pulse shape, or pulse position (range).

Accordingly, in this manner, with switch 45 in the position where its movable arm 46 is connected to the fixed contact 43 thereof, the radar system will be tested for impulses that are received which are a combination of a moving target superimposed or in combination with a large fixed target.

It should be noted that if a clutter target, which does not vary from pulse to pulse, is added to the moving target which does vary from pulse to pulse in amplitude or in phase, then the sub-clutter visibility of the combined targets so formed, as shown in Figs. 5(a) and (b) differs from the sub-clutter visibility of the original moving target 63 alone. If the added clutter signal 64 is either much greater in amplitude or much less in amplitude than the moving target 63, then the new SCV–DB of the combined clutter plus moving target is easily computed. However, if the clutter amplitude becomes closer than ten-to-one away from the moving target amplitude, then more careful computations are needed for accurate results. This is particularly true when the moving target is phase modulated at a large angle. As a matter of practice, it is often convenient merely to consider and measure the radar's response to a moving target of a certain SCV–DB and amplitude, and then to test the radar's action at a new point on its dynamic response curve by throwing a big clutter target on top of the previously tested moving target.

The clutter target can be represented as big by having its amplitude 20 to 40 db above the moving target amplitude and having its pulse length, or extent in range, be set 2 to 5 or more times as long as the moving target pulse length (which in this simulator always is the same as the radar's own pulse length and shape).

In the event that the switch 22' is placed in the on position with the movable arm 21' thereof placed in contact with the fixed contact 23' thereof, and the switch 45 is placed with its movable arm 46 in contact with the contact 44, a different situation exists. In this latter switching operation it can be seen that the I. F. clutter pulse emitted from the oscillator 70 is applied directly to the output of the third I. F. amplifier 28 so that it is not circulated in the delay loop. Therefore, only one large impulse 64 will be provided for each impulse received from the radar set. Accordingly, there will be one impulse 64 for an entire series of impulses 63 and 63'.

Referring now to Fig. 3 a different modulator is provided for the modulator 24 of Fig. 1. The crystal mixer 22' corresponds both in operation and position to the crystal mixer 22 of Fig. 1. Similarly, the potentiometer 41' also corresponds to the potentiometer 41 of Fig. 1. The I. F. clutter generator 70 and its associated circuit are not shown in Fig. 3 in order to avoid unnecessarily complicating the drawing, but it is clear that this connection may be made in the same manner as made in Figs. 1 and 2, after the modulator's vector adder 120 of Fig. 3.

In the apparatus illustrated in Fig. 3, the impulses received from the output of the phase shifter 23' are separated and applied through a modulator channel number 1 which is a modulator 90 and a modulator channel number 2 which is modulator 110. The impulses that pass through the modulator 90 have only constant effects in either phase or in gain and are applied to one input of the vector adder 120. The impulses that are applied to the modulator 110 are first transmitted through a switch 66.

The switch 66 has one contact 67 connected to a 90° phase shifter 130 and the other contact 68 directly connected to the input of a phase shifter 140. The phase shifter 140 may be either a fixed or a variable phase shifter.

From the position of the switch 68 it is clear that the impulse applied to the switch can either be shifted by a fixed phase shift of 90° by passing through the phase shifter 130 or it may be applied in the illustrated position of the switch 66 to the input of the phase shifter 140 without the 90° constant phase shift. The output of the phase shifter 140 is applied directly to the modulator 110.

Connected to the phase shifter 140 and the modulator 110 is a phase and gain control 150. With the phase and gain control 150 it is possible to vary both the amplitude and the phase of the impulses applied to the modulator 110, or either of them, from pulse to pulse, since the phase and gain versus time control 150 can be connected to the timing circuits of the members 30—34 of Fig. 1. This would give either a simple pulse to pulse variation of phase and amplitude in the target output or enable the circuits to vary the targets in a more complex manner as will be further described hereinbelow.

If it is desired, either the amplitude or the phase can be varied independently. The output impulse from the modulator 110, which has been shifted either in phase or in amplitude, or both, is applied to one input of the vector adder 120.

In the vector adder 120 the two impulses coming from modulators 90 and 110 respectively are mixed and the resultant output has a wave shape which is a combination of the two impulses applied to the vector adder 120. It is clear, that in this manner, it is theoretically possible to obtain an unlimited number of wave shapes. For example, in Fig. 6(a) a wave shape is shown which simulates a target which is moving very fast away from the radar system. It is clear that the amplitude 71 of the impulse is decreasing with time which indicates that the target is receding from the radar system. Of course, it should be appreciated that the speed of the moving target would have to be substantial in order for its target return to change as rapidly as illustrated relative to the length of the search pulse from the radar system.

In Fig. 6(b) a wave shape is shown wherein the amplitude 72 is increasing with time. It is clear that this would correspond to a target which is moving substantially directly towards the radar system.

In Fig. 6(c) a plurality of impulses 73 are shown having an artificial configuration which is merely meant to illustrate that any and all types of pulse shapes can be provided from the simulator of Fig. 3 depending on the combination of phase shifts and amplitude changes in each of the modulator channels which may of course be greater than the two shown in Fig. 3. It is also possible to provide the same phase and gain control versus time for modulator 90 in channel 1 as is provided for channel 2. The pulse shapes of Fig. 6(c) actually occur and have physical meanings as to the shape and speed of the target.

The operation of the potentiometer 41 of Fig. 1 has been described hereinabove wherein the operator of the test system manually varies the control 41. However, it is clear that an automatic system may be provided to prevent limiting action from occurring in the signal simulator. This automatic system, for example, can be similar AVC which is an automatic volume control or else be a limiter to provide the opposite action.

An additional type of target modulation can be provided which is useful in the non-coherent simulator. This type of modulation corresponds to a range modulation wherein a simulated target could be made to advance or retreat a desired fixed distance from one pulse to the next either towards or away from the radar system. This could be accomplished by inserting or removing a calibrated delay in the path of the simulated target return through the simulator and back to the radar from one pulse to the next. The calibrated variable delay lines or delay trigger circuits can be switched in and out from pulse to pulse by the simulator in the same manner as the delay loop provides a small phase delay from pulse to pulse. Since the severe phase stability requirements needed for the coherent type of MTI radar systems are not necessary for the non-coherent MTI radar systems, an oscillator which is not as stable as the stable local oscillator 21 of Fig. 1 can be provided. For this purpose, for example, a simpler and cheaper reflex klystron oscillator could be used.

A type of non-coherent MTI radar system which the signal simulator incorporatinng the principles of the present invention can be used for testing is the type described, for example, in Section 12.8 of "Radar System Engineering"—volume 1, M. I. T. Radiation Laboratory Series, L. Ridenour, editor.

It will be understood that each of the elements described above or two or more together, may also find a useful application in other types of radar signal simulators differing from the types described above.

While the invention has been illustrated and described as embodying a radar signal simulator for non-coherent MTI radar systems, it is not intended to be limited to the details shown, since various modifications and structural changes may be made without departing in any way from the spirit of the present invention.

It is to be noted here that the new and improved type of radar signal simulator incorporating the principles of the present invention also incorporate provisions for complete control of the target signals returned to the radar in amplitude and in phase. Therefore, by a Fourier or other synthesis, any and all possible return targets can be theoretically generated. It is merely necessary for the radar designed to specify a particular type of target and the simulator incorporating the principles of the present invention can synthesize that target and return it on cue to the radar via directional coupler or antenna or other means.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A radar signal simulator wherein voltage impulses are generated for simulating radar targets, comprising, in combination, receiver means adapted to be coupled to a radar unit for receiving carrier frequency radar impulses; and generating means coupled to said receiver means for producing at least a first and a second retarded carrier frequency impulses in synchronism with each of said received radar impulses respectively, said first produced retarded carrier frequency impulse corresponding to a fixed radar target and said second produced retarded carrier frequency impulse corresponding to a moving radar target, said generating means including therein means for shifting the phases and amplitudes of said retarded carrier frequency impulses by predetermined amounts.

2. A radar signal simulator wherein voltage impulses are generated for simulating radar targets, comprising, in combination, receiver means adapted to be coupled to a radar unit for receiving carrier frequency radar impulses; and generating means coupled to said receiver means for producing at least a first retarded carrier frequency impulse and a plurality of second retarded carrier frequency impulses in synchronism with each of said received radar impulses respectively, said first produced retarded carrier frequency impulse corresponding to a fixed radar target and said plurality of second produced retarded carrier frequency impulses corresponding to moving radar targets, said generating means including therein means for shifting the phases and amplitudes of said retarded carrier frequency impulses by predetermined amounts.

3. Apparatus as claimed in claim 1 wherein said generating means produces at least one retarded carrier frequency impulse in synchronism solely with alternate ones of said received carrier frequency radar impulses.

4. Apparatus as claimed in claim 1 wherein said generating means includes therein means for eliminating alternate ones of said retarded carrier frequency impulses.

5. Apparatus as claimed in claim 2 wherein said generating means produces a group of first retarded carrier frequency impulses and a group of second retarded carrier frequency impulses in synchronism with each of said received radar impulses respectively, respective impulses in each of said groups being spaced in time from one another by the same predetermined time interval.

6. Apparatus as claimed in claim 5 wherein said shifting means of said generating means shifts the phase of the carrier frequency of adjacent groups of retarded carrier frequency impulses by a predetermined amount and maintains the phase of the carrier frequency of alternate groups of retarded carrier frequency impulses the same.

References Cited in the file of this patent

UNITED STATES PATENTS

| | | |
|---|---|---|
| 2,421,016 | Deloraine et al. | May 27, 1947 |
| 2,765,460 | Marion | Oct. 2, 1956 |

OTHER REFERENCES

"Radar System Engineering," by Ridenour M. I. T. Rad. Lab. Series, vol. 1 (1947), pages 677–679. McGraw-Hill Book Co., N. Y.